(12) United States Patent
Weber et al.

(10) Patent No.: US 7,451,397 B2
(45) Date of Patent: Nov. 11, 2008

(54) SYSTEM AND METHOD FOR AUTOMATICALLY COMPLETING SPREADSHEET FORMULAS

(75) Inventors: Brandon G. Weber, Kirkland, WA (US); Charles David Ellis, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 150 days.

(21) Appl. No.: 11/012,964

(22) Filed: Dec. 15, 2004

(65) Prior Publication Data
US 2006/0129929 A1  Jun. 15, 2006

(51) Int. Cl.
G06F 17/00 (2006.01)
(52) U.S. Cl. .................. 715/267; 715/212; 715/217; 715/218; 715/219; 715/220; 715/255
(58) Field of Classification Search .............. 715/503, 715/504, 508, 538, 212, 217, 218, 219, 220, 715/255, 267
See application file for complete search history.

(56) References Cited

U.S. PATENT DOCUMENTS

| | | | | |
|---|---|---|---|---|
| 5,845,300 A | * | 12/1998 | Comer et al. | 715/508 |
| 5,890,174 A | * | 3/1999 | Khanna et al. | 715/504 |
| 6,828,988 B2 | * | 12/2004 | Hudson et al. | 715/711 |
| 6,829,607 B1 | * | 12/2004 | Tafoya et al. | 707/6 |
| RE39,326 E | * | 10/2006 | Comer et al. | 715/508 |
| 7,149,970 B1 | * | 12/2006 | Pratley et al. | 715/533 |
| 7,325,194 B2 | * | 1/2008 | Moore et al. | 715/255 |
| 2002/0143830 A1 | * | 10/2002 | Bennett | 707/538 |
| 2003/0056181 A1 | * | 3/2003 | Marathe | 715/538 |
| 2003/0191765 A1 | * | 10/2003 | Bargh et al. | 707/100 |
| 2005/0044497 A1 | * | 2/2005 | Kotler et al. | 715/538 |
| 2005/0050470 A1 | * | 3/2005 | Hudson et al. | 715/711 |
| 2006/0069993 A1 | * | 3/2006 | Jones et al. | 715/538 |

OTHER PUBLICATIONS

Computer Training and Support Services, Academic Computing & Networking, "Excel 2000 Part 1", 2000, pp. 1-6, Available: http://www.colostate.edu/Services/ACNS/standards/office/excel/excel2000P1.doc.*
Valle, Araceli et al., "How to Simplify Writing Evaluations Using Excel and MailMerge", Mar. 19, 2002, pp. 1-8.*

* cited by examiner

Primary Examiner—Rachna S Desai
(74) Attorney, Agent, or Firm—Merchant & Gould

(57) ABSTRACT

A system and method for automatically completing a formula of a spreadsheet application, calculator application, accounting application, business application or banking application. One aspect of the present invention is a computer-implemented method for automatically completing formulaic cell data. The computer-implemented method includes a step for substantiating an autocomplete process in response to a user input of formulaic cell data and aggregating autocomplete options based on the user input. Another aspect of the present invention includes displaying a dynamic list of autocomplete options when the user input is a trigger.

15 Claims, 11 Drawing Sheets

*Fig.3*

SYSTEM AND METHOD FOR AUTOMATICALLY COMPLETING SPREADSHEET FORMULAS

BACKGROUND OF THE INVENTION

Cells of a spreadsheet, calculator application, accounting application, business application, or banking application allow a user to build formulas. These formulas may include references to other cells, formulas, lists, user-defined functions, etc. The use of functions and references in a spreadsheet makes spreadsheets a powerful tool because a user can build complex formulas and analyze a wide range of data.

In current spreadsheet programs, building a cell formula is not an easy task because there is a large gap between getting help for building a formula and building the formula itself. Typically, a user is required to remember the name of a formula, remember how to spell a formula and remember the proper values to use in arguments. Such a requirement slows down the process of building a formula and often prevents users from successfully completing their task.

A user may be required to have formulas and references memorized to build a formula in a spreadsheet. Such memorization may include memorizing a formula name, memorizing arguments, or memorizing objects that are to be included in the formula. If a user does not have these elements memorized, the user must leave the cell and go elsewhere for help in building the formula. Succinctly stated, the user must remember and understand all aspects of the formula they are trying to build.

Formulaic expressions often include complex formula syntax, multiple arguments, and multiple parameters. Formulaic expressions may also include nested functions within a single formula with each nested function requiring multiple parameters. Such formulaic expressions increase memorization difficulties and increase the opportunity for typing errors.

Function wizards have further hindered the process of building a formulaic expression. A function wizard pulls the user out of the context of the spreadsheet. By pulling a user away from a formulaic express, a thought process may be broken and the general speed of formula building is reduced.

SUMMARY OF THE INVENTION

The present invention generally relates to a system and method for automatically completing formulaic data of a spreadsheet, calculator application, accounting application, business application, banking application or the like. One aspect of the present invention is a computer-implemented method for automatically completing spreadsheet formulas. The computer-implemented method includes a step for substantiating an autocomplete process in response to a user input of formulaic cell data. Steps are also included for aggregating autocomplete options based on the user input and displaying a dynamic list of autocomplete options if the user input is a trigger of the autocomplete functionality.

Another aspect of the present invention is a computer-readable medium having computer-executable instructions. The computer-executable instructions include steps for accessing a store of aggregated autocomplete options and comparing a user input to the store. The instructions may also include steps for displaying a dynamic list of autocomplete options that are associated with the user input and filtering the dynamic list of autocomplete options to match further user input.

Still another aspect of the present invention includes a computer-readable medium having stored thereon a data structure. The data structure includes a first data field adapted for a user input and a second data field that includes an aggregation of autocomplete options for automatically completing the first data field. The data structure also includes a third data field that includes an unfiltered list of the second data field if the user input does not contain any matching autocomplete options. The data structure further includes a filtered list of the second data field if a user input contains matching autocomplete options.

Yet another aspect of the present invention includes a computer system having a graphical user interface including a display and a user interface selection device, a method of providing and selecting from a dynamic list on the display. The method of providing and selecting includes substantiating an autocomplete process in response to a user input into a cell and aggregating autocomplete options based on the user input. The method of providing and selecting may also include displaying a filtered dynamic list of autocomplete options when the user input implies formula construction and the user input is associated with autocomplete options. Moreover, the method of providing and selecting may include displaying an unfiltered dynamic list of autocomplete options if the user input is associated with the autocomplete options and hiding the autocomplete process so that a list is not displayed if the user input is not associated with the autocomplete options.

BRIEF DESCRIPTION OF THE DRAWINGS

FIG. 3 illustrates an exemplary user interface that may include embodiments of the present invention.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Figure 3:
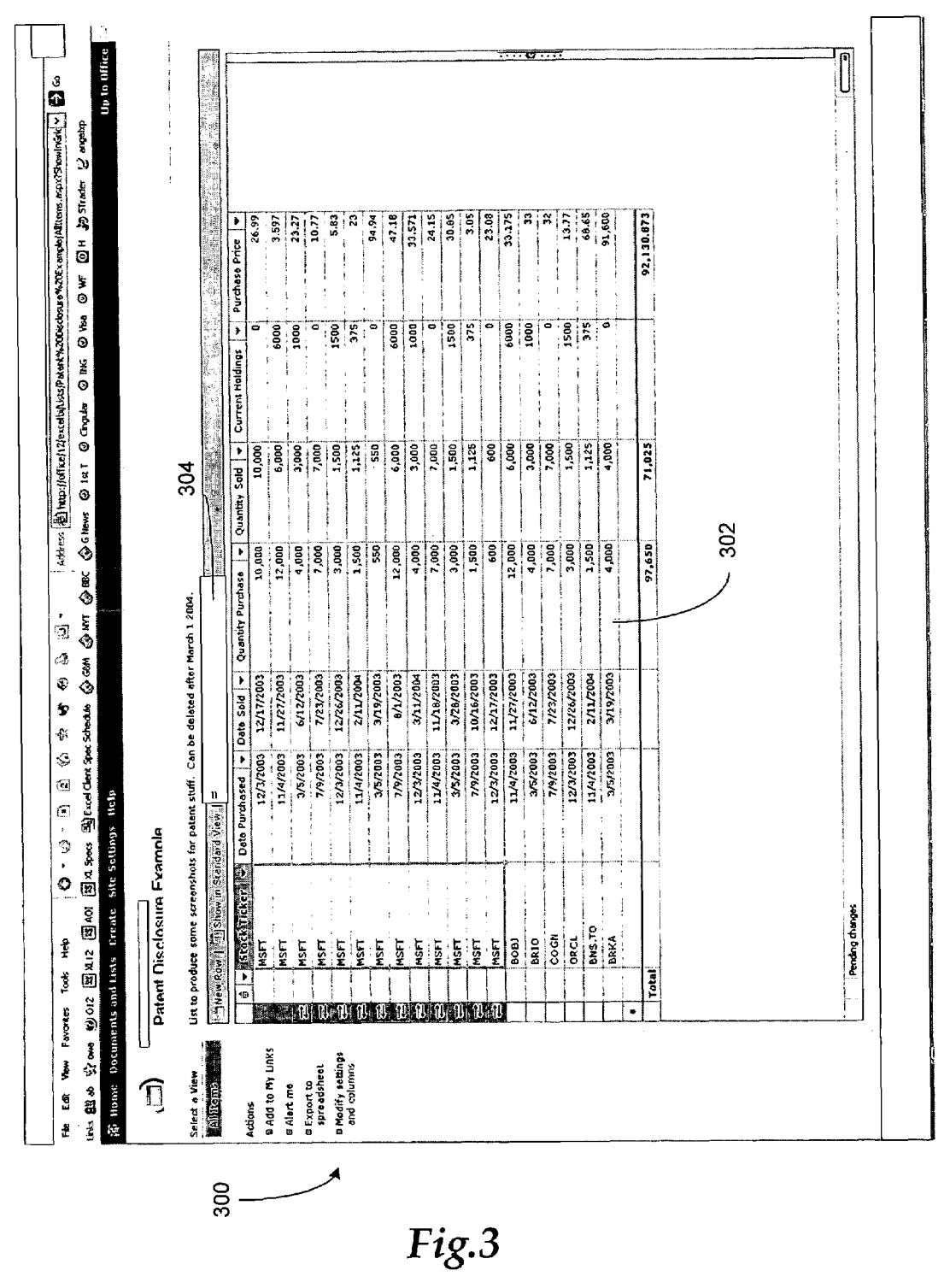

Illustrative Embodiments of a Method and System for Automatically Completing a Formulaic Cell 1. Exemplary User Interface FIG. 3 illustrates an exemplary spreadsheet user interface that may be used in one exemplary embodiment of the present invention. The spreadsheet 300 may be any type of spreadsheet used to calculate and keep track of data. The spreadsheet 300 may include one or more formulaic cells 302. The formulaic cells 302 may be configured to receive formulas, equations, numbers, letters, symbols, words, formulaic cell dependencies or any other data forms that are conducive to a spreadsheet. The formulaic cell 302 may be defined as a cell that is configured to allow one or more components. A component may be defined as any type of formulaic data. Such components may include a formula dependency, a spreadsheet function dependency, a defined name dependency, a list dependency, a pivot dependency, a user defined function dependency, an enumerated argument dependency, a sheet data dependency, a date object dependency or other dependencies. In one embodiment, the components are stored in one or more arrays as will be more fully set forth below. The spreadsheet 300 may also include a formulaic cell-viewing window 304 for allowing a user easy access to data in the formulaic cell 302.

Even though the present invention is taught in conjunction with a spreadsheet 300, it is contemplated that the present invention could be implemented with any application or program having a formulaic cell 302. The spreadsheet 300 is merely taught herein for exemplary and descriptive purposes and should not be considered limiting. For example, the present invention may be used in conjunction with a calculator application where the calculator has a single formulaic cell. Accounting applications, business applications, and banking applications that have formulaic cells are also contemplated.

Figure 4:
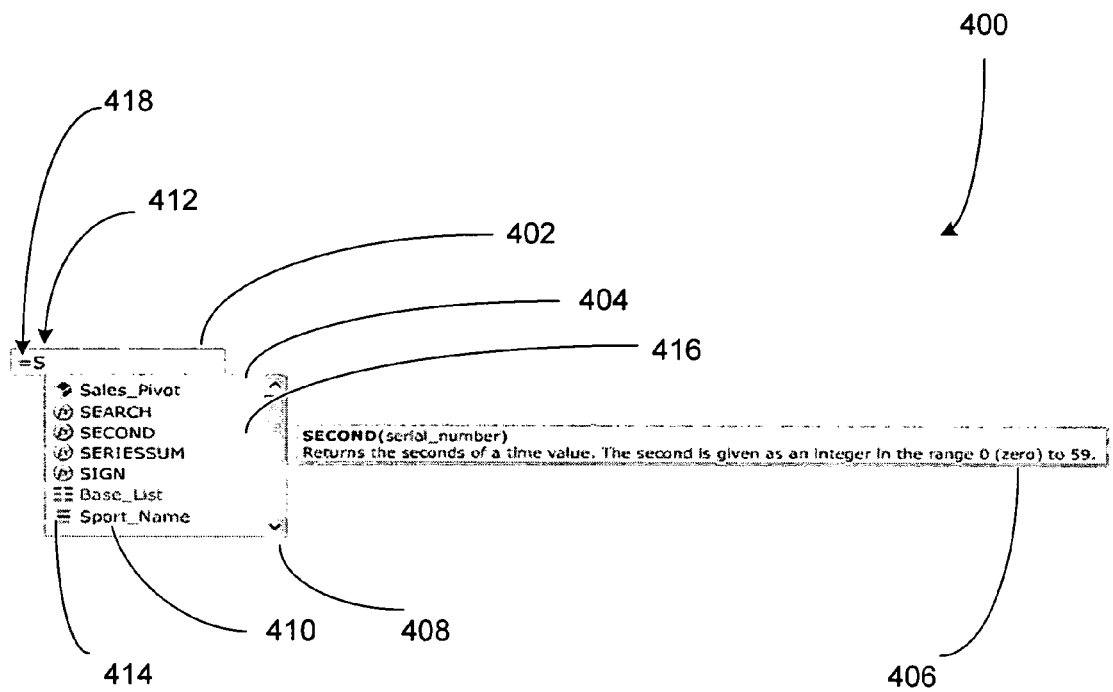
FIG. 4 illustrates one exemplary aspect of automatically completing a formulaic cell.

FIG. 4 illustrates one exemplary aspect of automatically completing a formulaic cell. Reference number 400 is an exemplary user interface that may include a formulaic cell 402, a drop down window 404 and a tips window 406. The formulaic cell 402, drop down window 404 and tips window 406 may be set to a default shape and size or the shape and size may be adjustable by a user. Also, the tips window 406 and drop down window 404 may be positioned in any manner relative to the formulaic cell 402. In one embodiment, the tips window 406 and the drop down window 404 always remain to the right of any user input.

Drop down window 404 may further include a scrollbar 408 to allow a user easy access to the autocomplete members (e.g., 410). As will be further set forth below, the autocomplete members correlate to the input trigger 412. An input trigger may include an input that prompts the display of components in the drop down window 404. As a user progresses with an input trigger 412, the autocomplete members are filtered to only display the most relevant members. In one embodiment of the present invention, the autocomplete members are dynamic and include an aggregation of all available options for the formulaic cell 402.

Drop down window 404 may also include autocomplete icons 414. As will be further set forth below, the autocomplete icons 414 may indicate that an autocomplete member 410 belongs to a particular type of component category. For example, the autocomplete icons 414 may indicate that an autocomplete member 410 is a spreadsheet function dependency, a defined names dependency, a list dependency, a pivots dependency, a user defined function dependency, an enumerated argument dependency, a sheet data dependency, a data object dependency or the like. The type of component may be important because a trigger may only implicate a particular type of component. The drop down window 404 may further include a selection indicator 416 for identifying a particular autocomplete member 410.

In one aspect of the present invention, the interface 400 includes a tips window 406. The tips window 406 includes information relevant to a selected autocomplete member 410. The tips window 406 increases the usability of the interface 400 in that a user may not remember (or understand) the full functionality of an autocomplete member 410. Also, the tips window 406 allows access to information without requiring a user to initiate a separate help function.

Reference number 418 is an autocomplete actuator. The actuator 418 prompts the formulaic cell 402 into an autocomplete process. The autocomplete process and the interface 400 remain dormant until actuated by the autocomplete actuator 418. In this manner, the interface 400 does not become invasive to a user when the user is not inputting a component. In one embodiment, the autocomplete actuator 418 merely prompts an autocomplete process whereas the input 412 prompts the display of the drop down window 404 when the input 412 is a trigger. For example a single number, letter or cell dependency may not be a user input trigger; therefore, the drop down window is not displayed. This process reduces any invasiveness of the interface 400 when it is not needed. In one aspect of the present invention the autocomplete process may be manually actuated by a user. In another aspect of the present invention, the actuator 418 is the "=" symbol; however, any number, letter or symbol may be used without departing from the spirit and scope of the present invention.

TABLE 1, below, indicates a plurality of exemplary ways a user may interact with the interface in order to insert a selected autocomplete member. Column 1 indicates exemplary user actions and column 2 is a description of exemplary responses in the interface. TABLE 1 represents general examples of keyboard and mouse interactions and is not meant for limiting the present invention.

TABLE 1

| Action | Description |
| --- | --- |
| Double clicking an auto complete member. | When the user double clicks an autocomplete member it will be inserted into the formulaic cell (selection does not have to be on it). The cursor is moved directly after the member. |
| Engaging the ENTER key | Inserts the selected autocomplete member and positions the cursor directly after the inserted autocomplete member. |
| Engaging the TAB key | Inserts the selected autocomplete member and positions the cursor directly after the inserted autocomplete member. |
| Key combination ALT+ENTER | Inserts the selected autocomplete member and positions the cursor directly after the inserted autocomplete member. |

TABLE 1-continued

| Action | Description |
| --- | --- |
| Key combination SHIFT+ENTER | Inserts the selected autocomplete member and positions the cursor directly after the inserted autocomplete member. |
| Key combination CTRL+ENTER | Inserts the selected autocomplete member and positions the cursor directly after the inserted autocomplete member |

TABLE 2, below, indicates exemplary navigation tools for the drop down window. Column 1 identifies exemplary actions. Column 2 identifies exemplary responses in the interface when an autocomplete member is not selected and column 3 indicates exemplary responses in the interface when an autocomplete member is selected. TABLE 2 represents general examples of keyboard interactions and is not meant for limiting the present invention.

TABLE 2

| Action | Behavior when an autocomplete array member is not selected | Behavior when an autocomplete array member is selected |
| --- | --- | --- |
| Engage ←(left arrow) key | Move cursor one character to the left and the drop down window stays open. | Move cursor one character to the left and the drop down window stays open. |
| Engage → (right arrow) key | Move cursor one character to the right and the drop down window stays open | Move cursor one character to the right and the drop down window stays open. |
| Engage ↑ (up arrow) key | Identifies the best autocomplete array member match in the drop down window. | Moves the selection indicator up one item in the drop down window. |
| Engage ↓ (down arrow) key | Identifies the best autocomplete array member match in the drop down window. | Moves the selection indicator down one item in the drop down window. |
| Engage END key | Exits process. | Selection indicator moves to last member in autocomplete array. |
| Engage HOME key | Exits process. | Selection indicator moves to first member in autocomplete array |
| Engage PAGEDOWN key. | Exits process. | Moves selection indicator to the last viewable item in drop down window (if selection indicator is on the last item, the selection indicator moves down another set of items and selects the last viewable item in the drop down window). |
| Engage PAGEUP key. | Exits process. | Moves selection indicator to the first viewable item in drop down window (if selection indicator is on the first item, the selection indicator moves up another set of items and selects the first viewable item in the drop down window). |
| Change application focus. | Exits process. | Closes auto complete. |

TABLE 3, below indicates several exemplary scenarios when the drop down window has no matches for the user input. Column 1 identifies exemplary user input scenarios and column 2 is an exemplary description of the response in the interface. TABLE 3 represents general examples of keyboard interactions and is not meant for limiting the present invention.

TABLE 3

| User Input Scenario | Description of Response |
| --- | --- |
| User input is recognized as text Ex. =Sz | If "Sz" is not recognized, show the autocomplete array members for "S". |
| User input is recognized as a cell reference Ex. =a13 | Hide drop down window |
| User input is recognized as a cell reference (R1C1 notation) Ex. R[1]C[3] | Hide drop down window |
| User input is recognized as a number Ex. =345 | Hide drop down window |

Several rules may be provided for when a user instigates an autocomplete process while building a component. Some examples of these rules include that characters to the right of the cursor may be ignored. These characters are "pushed back" (not overwritten) when an autocomplete array members is inserted. Characters to the left of the cursor are analyzed for an autocomplete process if the text to the left of the cursor is an input trigger and the input trigger implicates a component (e.g. a formula dependency, a spreadsheet function dependency, a defined name dependency, a list dependency, a pivot dependency, a user defined function dependency, an enumerated argument dependency, a sheet data dependency, or a date object dependency). In such a situation, the autocomplete members may be filtered so that the process returns autocomplete array members as if the input trigger was just entered. If the text to the left of the cursor is a "space", arithmetic operator (+, −, /, *, etc.) or character operator (&) (e.g. component not implicated), then the autocomplete members include all possible autocomplete members (i.e. not filtered). If the user is at the end of a full autocomplete word (vlookup, myList, etc.) then the autocomplete members include all possible members (i.e. not filtered, because component not implicated). If a character is deleted from an autocomplete word then the autocomplete array members include members based on the remaining portion of the word. In light of the disclosure herein, other rules may also be provided for when a user instigates an autocomplete process than those described.

TABLE 4, below, indicates several exemplary scenarios that exemplify the rules that may be followed when a user instigates an autocomplete process while building a component. Column 1 identifies exemplary user input scenarios and column 2 indicates exemplary descriptions of the response in the interface. TABLE 4 represents general examples of keyboard interactions and is not meant for limiting the present invention.

TABLE 4

| User Input Scenario (I = Cursor) | Description of Response |
| --- | --- |
| =CounIt(A1:G4) | Shows the autocomplete members for the text "coun" |
| =SUM(I | Shows all possible autocomplete members (no filtering). |
| =IF(ISEIRROR(VLOOKUP("poo",F12:F32,1,FALSE )), "this didn't work", B8) | Shows the autocomplete array members for the text "ISE". |
| =myValue+I42 | Shows all possible autocomplete array members. |

Figure 5:
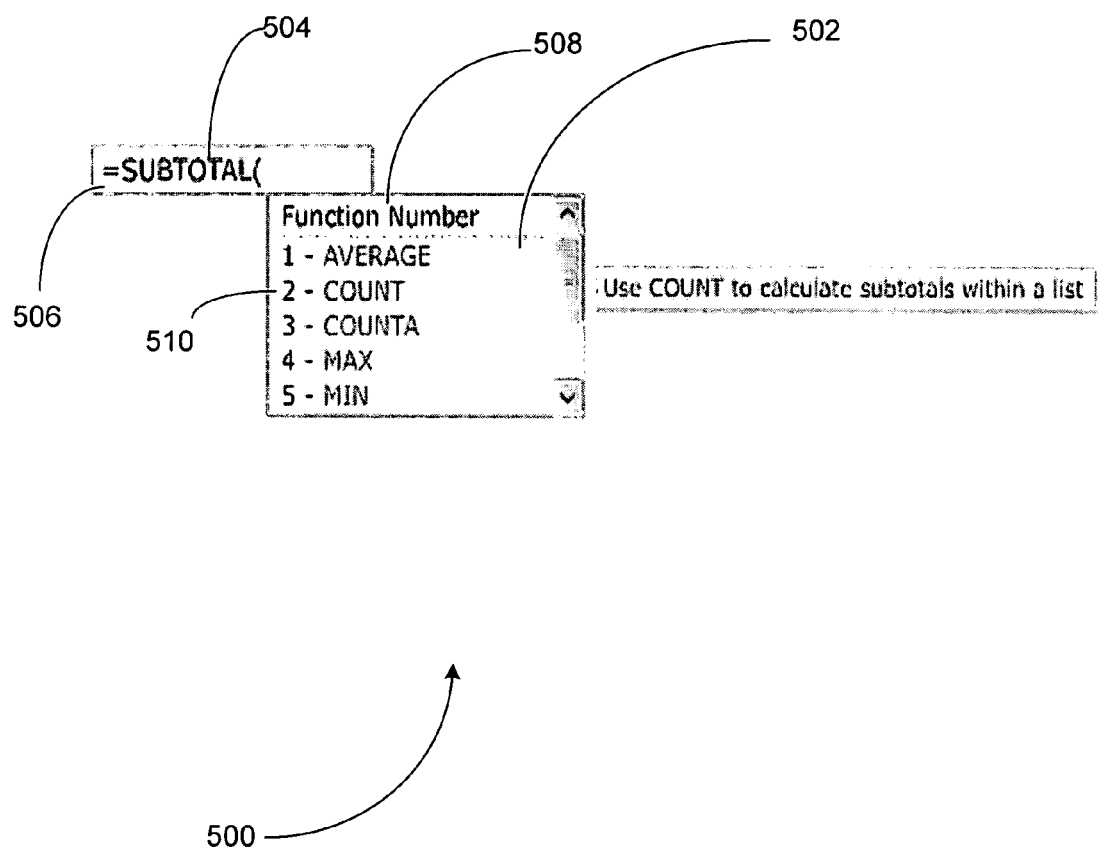
FIG. 5 illustrates one exemplary aspect of automatically completing a formulaic cell associated with a component that is an enumerated dependency.

FIG. 5 illustrates another exemplary aspect of automatically completing a formulaic cell. The exemplary user interface 500 is similar to the exemplary user interface 400 except that the user interface 500 includes an enumerated dependency drop down window 502. The enumerated dependency drop down window 502 is invoked when the input trigger 504 indicates that the user is inputting an enumerated dependency into the formulaic cell 506. The user interface may also include an enumerated dependency identifier 508. The enumerated dependency identifier 508 may be displayed at the top of the enumerated dependency drop down window 502 and identify a category of the enumerated dependency (e.g., 510).

Figure 6:
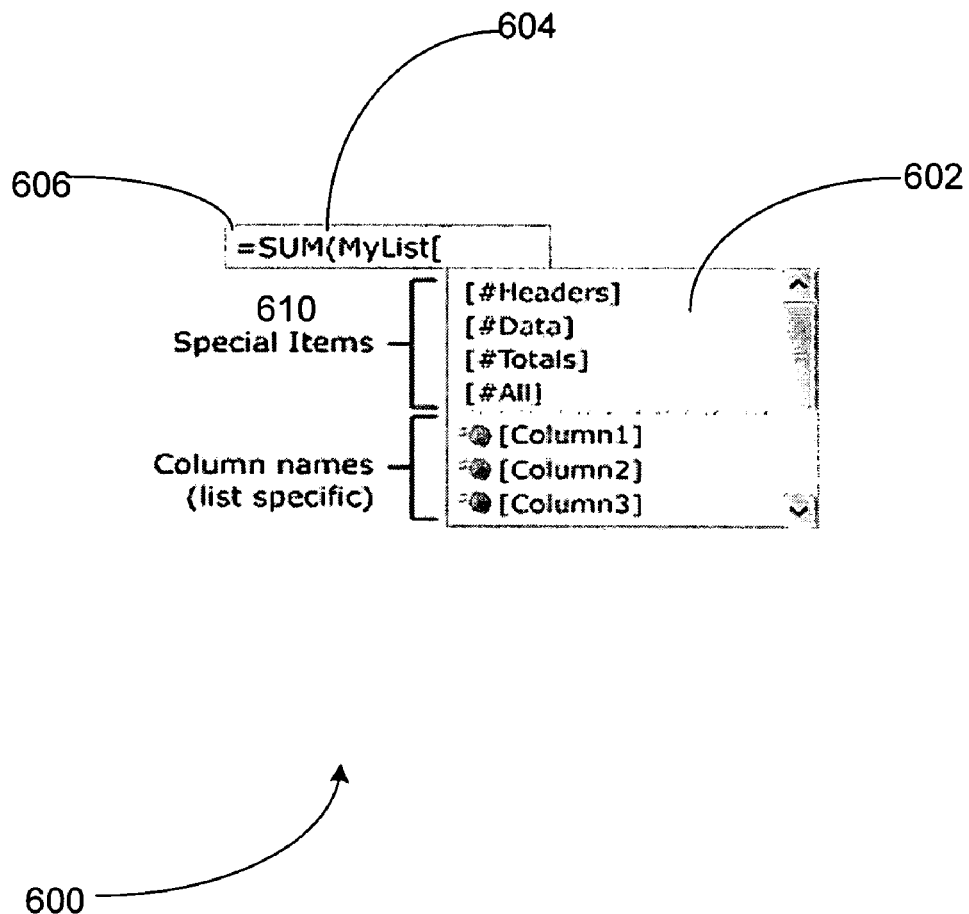
FIG. 6 illustrates one exemplary aspect of automatically completing a formulaic cell associated with a component that is a list dependency.

FIG. 6 illustrates yet another exemplary aspect of automatically completing a formulaic cell. The exemplary user interface 600 is similar to the user interface 400 except that the user interface 600 includes a list dependency drop down window 602. The list dependency drop down window 602 is invoked when the input trigger 604 indicates that the user is inputting a list dependency into the formulaic cell 606. When a user is inputting a list dependency, the user interface 600 will include column names 608 for the list, which may be list specific. The user interface 600 may also include special items 610 that may pertain to the list. Such special items may include #All, #Data, #Header, #Totals, or others.

Figure 7:
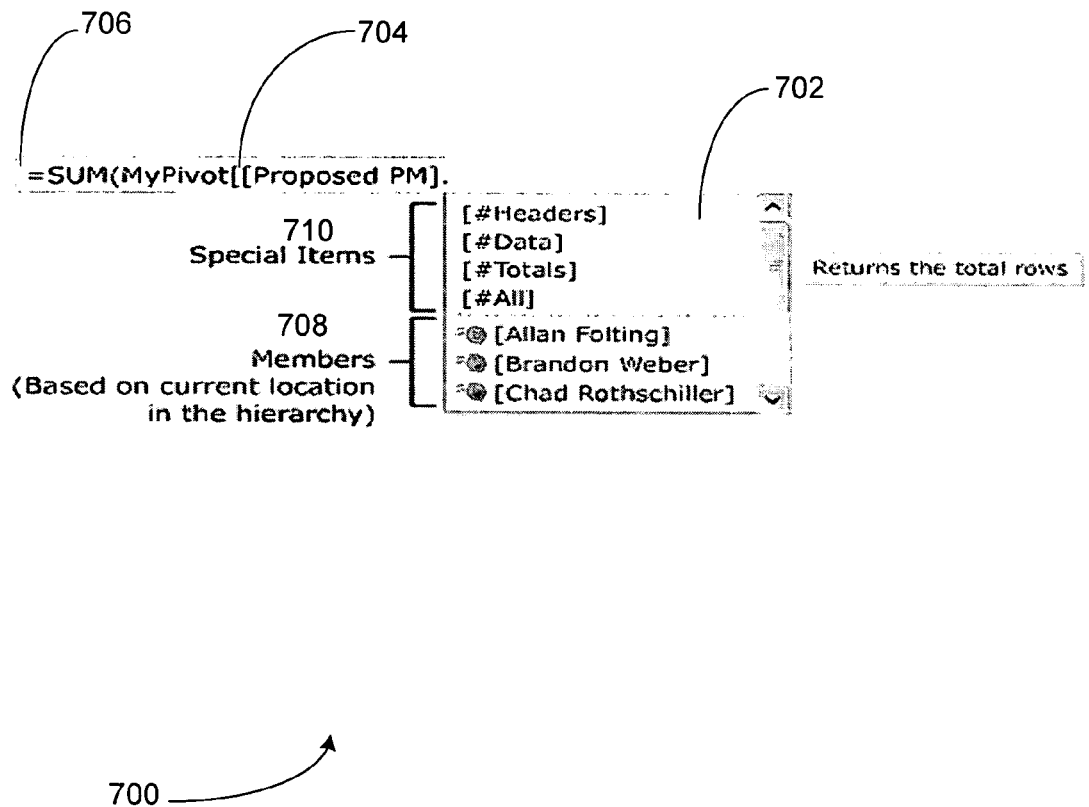
FIG. 7 illustrates one exemplary aspect of automatically completing a formulaic cell associated with a component that is a pivot dependency.

FIG. 7 illustrates still another exemplary aspect of automatically completing a formulaic cell. The exemplary user interface 700 is similar to the user interface 400 except that the user interface 700 includes a pivot dependency drop down window 702. The pivot dependency drop down window 702 is invoked when the input trigger 704 indicates that the user is inputting a pivot dependency into the formulaic cell 706. When a user is inputting a pivot dependency, the user interface 700 will include member names 708 for the pivot, which may be based on the current location in the pivot hierarchy. The user interface 700 may also include special items 710 that may pertain to the pivot. Such special items may include #All, #Data, #Header or #Totals.

Figure 8:
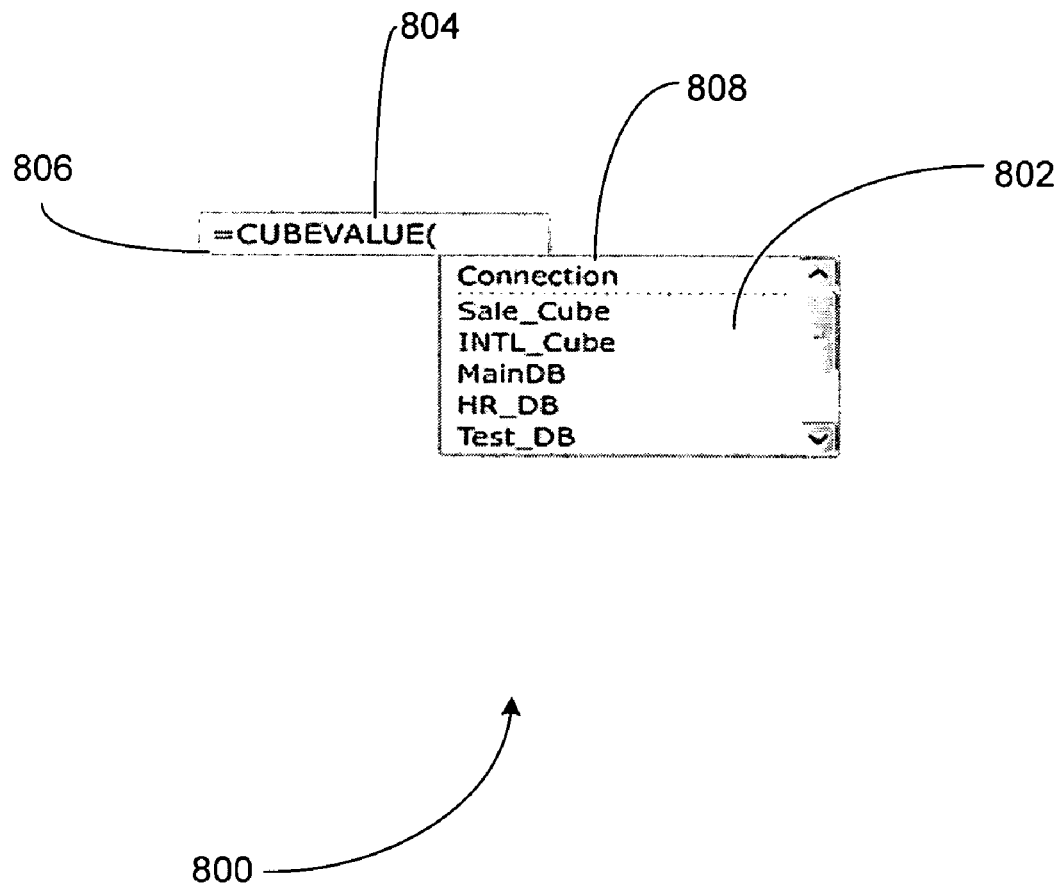
FIG. 8 illustrates one exemplary aspect of automatically completing a formulaic cell associated with a component that is a connection dependency.

FIG. 8 illustrates yet another exemplary aspect of automatically completing a formulaic cell. The exemplary user interface 800 is similar to the user interface 400 except that the user interface 800 includes a connection dependency drop down window 802. The connection dependency drop down window 802 is invoked when the input trigger 804 indicates that the user is inputting a connection dependency into the formulaic cell 806. The user interface may also include a connection identifier 808. The connection dependency identifier 808 may be displayed at the top of the connection dependency drop down window 802 and identify categories of the connection dependency.

Figure 9:
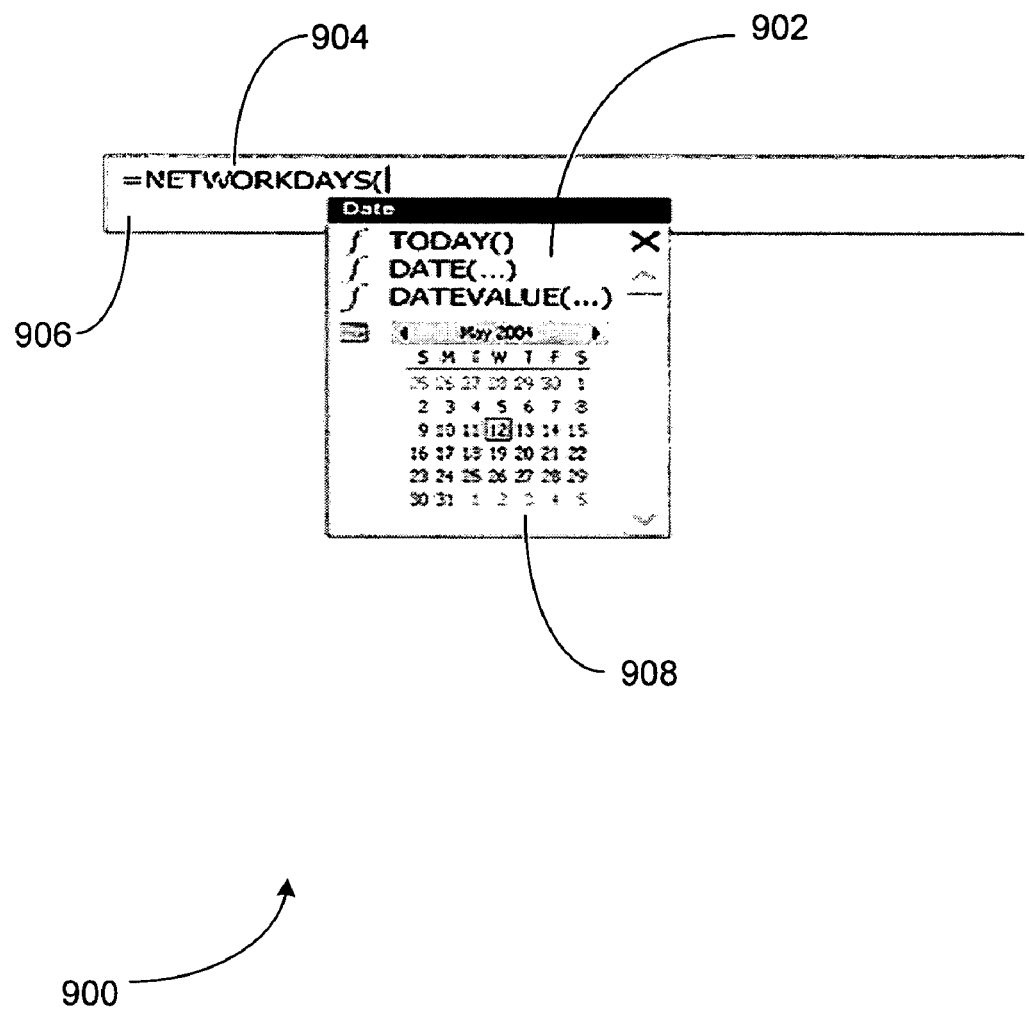
FIG. 9 illustrates one exemplary aspect of automatically completing a formulaic cell associated with a component that is a date dependency.

FIG. 9 illustrates still another exemplary aspect of automatically completing a formulaic cell. The exemplary user interface 900 is similar to the user interface 400 except that the user interface 900 includes a date dependency drop down window 902. The date dependency drop down window 902 is invoked when the input trigger 904 indicates that the user is inputting a date dependency into the formulaic cell 906. The user interface may also include a calendar object 908. The calendar object 908 may be displayed at the bottom of the date dependency drop down window 902 and provide a user a friendly interface for inserting a date.

2. Exemplary Data Store

Figure 10:
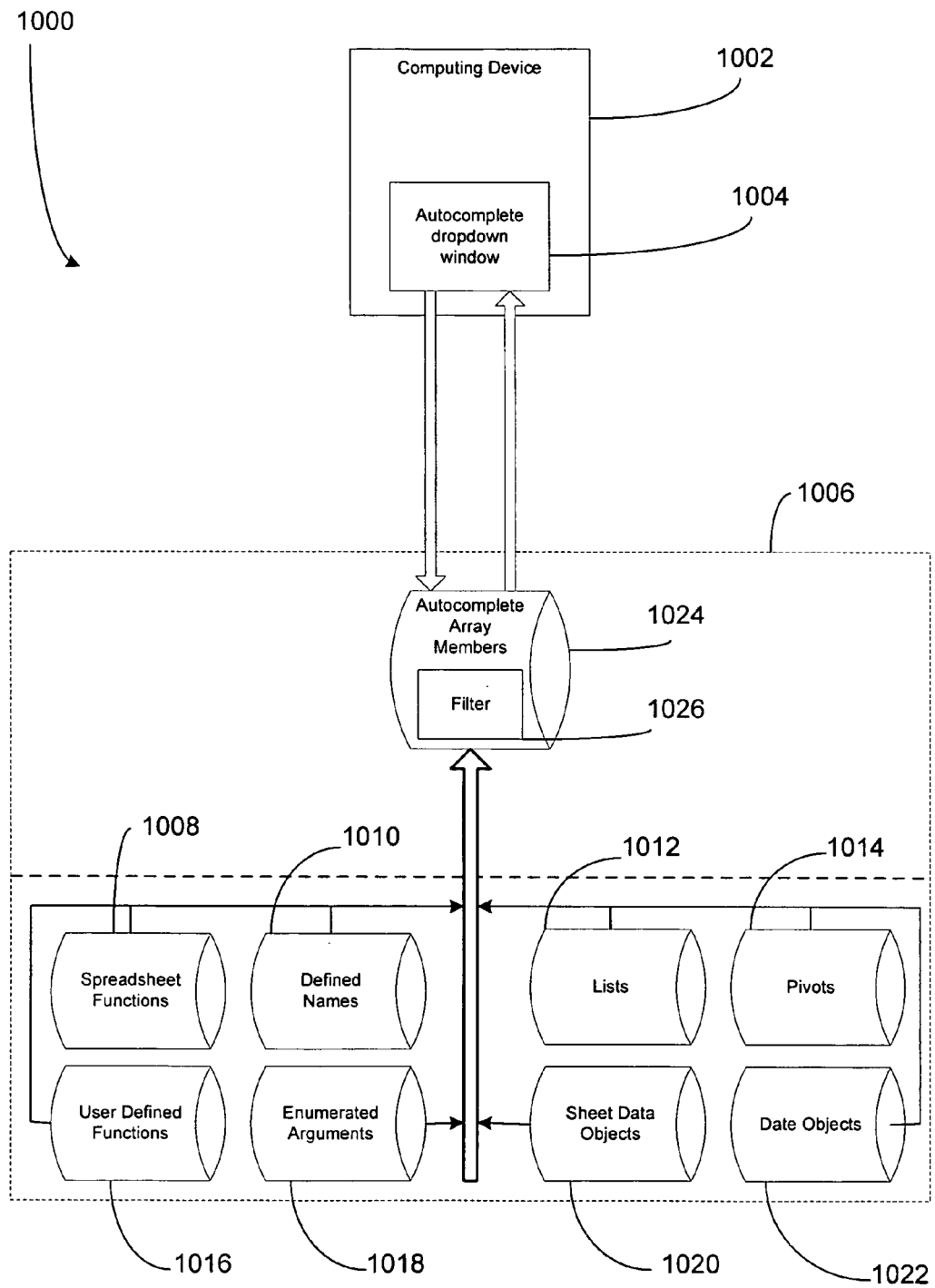
FIG. 10 illustrates an exemplary autocomplete member store of one aspect of the present invention.

FIG. 10 illustrates one exemplary embodiment for auto-completing formulaic cell data. The system 1000 includes a computer device 1002, which may be similar to the computing device 100 described above in conjunction with FIG. 1 or the mobile device 200 described above in conjunction with FIG. 2. The computing device 1002 may have an autocomplete application and the autocomplete application may include an autocomplete drop down window 1004 for displaying autocomplete members as set forth above.

Reference number 1006 indicates one embodiment of a data store. The data store 1006 may be comprised of a plurality of data stores (component stores). The data store 1006 may include a store for spreadsheet functions 1008, defined names 1010, lists 1012, pivots 1014, user defined functions 1016, enumerated arguments 1018, sheet data 1020 and date objects 1022. The data store 1006 may also include an autocomplete member store 1024 that may include a filter 1026. Even though the data store 1006 is represent in FIG. 10 as a plurality of data stores 1008-1024, the data store 1006 may be a single data store. It is further contemplated that the data store 1006 may include a pool of all components that could be used to autocomplete the formulaic cell 1002. It is also contemplated that the data store 1006 may be a filtered store that only includes a portion of all possible components that could be used to autocomplete the formulaic cell.

In one embodiment, an input trigger is input in the formulaic cell. The memory 1006 is then accessed and the stores 1008-1022 are compared to the input trigger to determine components that are relevant to the trigger. In another embodiment, only one or more particular stores 1008-1022 are accessed in response to a trigger if the trigger implicates a particular store. The relevant autocomplete members may then be stored as an array in the autocomplete member store 1024. The autocomplete dropdown window 1004 may display the most relevant autocomplete members of the store 1024. As a user progresses with entering an input, the autocomplete array members are continuously filtered so that the autocomplete dropdown window 1004 displays the most relevant autocomplete array members at any one particular time.

As an example related to FIG. 4, a user may input the input trigger 412 which may be the letter "S". In such a situation, the autocomplete process may not identify that the letter "S" relates to any particular type of component. The storage 1006 will then be accessed and the storage units 1008-1022 will be compared to the input trigger 412. All relevant components that start with the letter "S" will be stored in the autocomplete array member store 1024 and the autocomplete dropdown window 404 will display the most relevant components. If, for example, a user then enters the letter "a" after the letter "S", the components are further filtered to remove components that do not have the letter combination "Sa". In this manner, the autocomplete dropdown window 404 always displays the most relevant autocomplete array members 410. In another example, a user may input an input trigger, which may be an open bracket. An open bracket trigger may only implicate list dependencies. Accordingly, the autocomplete drop down window may only display list dependencies. As another example, the input trigger may be a "+" symbol. A "+" symbol may not implicate a particular type of component and therefore all components would be displayed in the drop down window.

3. Exemplary Input Triggers

As stated above, the autocomplete process may pool a variety of types of components in order to determine the most relevant components for a particular input trigger. The input trigger may also implicate a certain set of components. In such a situation, the autocomplete process may only need to access a certain component store. TABLE 5, below, indicates several exemplary context dependant input triggers for spreadsheet function dependencies and user defined function dependencies. Column 1 identifies exemplary user input scenarios and column 2 indicates exemplary descriptions of the response in the interface. TABLE 5 represents general examples of keyboard interactions and is not meant for limiting the present invention.

TABLE 5

| User Input Triggers For Spreadsheet Function and User Defined Input Dependencies | Description of Response |
|---|---|
| ( (Open parenthesis) | When a autocomplete member is selected, typing a left parenthesis will insert that function with a left parenthesis after it. |

TABLE 5-continued

| User Input Triggers For Spreadsheet Function and User Defined Input Dependencies | Description of Response |
|---|---|
| SPACE | When an autocomplete member is selected, engaging the space bar will insert the autocomplete member with a space after it. |

TABLE 6, below, indicates several exemplary context dependant input triggers for defined names. Column 1 identifies exemplary user input scenarios and column 2 indicates exemplary descriptions of the response in the interface. TABLE 6 represents general examples of keyboard interactions and is not meant for limiting the present invention.

TABLE 6

| User Input Triggers For Defined Names Dependencies | Description of Response |
|---|---|
| ) (close parenthesis) | When an autocomplete defined name is selected, typing a right parenthesis will insert that defined name with a right parenthesis after it. |
| , (comma) | When an autocomplete defined name is selected, typing a comma will insert that name with a comma after it. |
| In reference to any of the following inputs: Arithmetic operator | When an autocomplete defined name is selected, typing an operator will insert that name with the operator after it. |
| + (plus sign) − (minus sign) * (asterisk) / (forward slash) % (percent sign) ^ (caret) Comparison operator | |
| = (equal sign) > (greater than sign) < (less than sign) >= (greater than or equal to sign) <= (less than or equal to sign) <> (not equal to sign) Text operator | |
| & (ampersand) Reference operator | |
| : (colon) , (comma) | |
| SPACE | When an autocomplete defined name is selected, engaging the space bar will insert that name with a space after it. |

TABLE 7, below, indicates several exemplary context dependant input triggers for a list name. Column 1 identifies exemplary user input scenarios and column 2 indicates exemplary descriptions of the response in the interface. TABLE 7 represents general examples of keyboard interactions and is not meant for limiting the present invention.

TABLE 7

| User Input Triggers For List Name Dependencies | Description of Response |
|---|---|
| [ (Open square bracket) | When an autocomplete list name is selected, typing left bracket will insert that list with a left bracket after it. |
| All user input triggers for defined names dependencies. [TABLE 6] | The input triggers for defined names dependencies will work the same way for list name dependencies. |

TABLE 8, below, indicates several exemplary context dependant input triggers for a list field. Column 1 identifies exemplary user input scenarios and column 2 indicates exemplary descriptions of the response in the interface. TABLE 8 represents general examples of keyboard interactions and is not meant for limiting the present invention.

TABLE 8

| User Input Triggers For List Field Dependencies | Description of Response |
|---|---|
| ] (Close square bracket) | When an autocomplete list field is selected, typing a right bracket will insert that field with a right bracket after it. |
| , (Comma) | When an autocomplete list field is selected, typing a comma will insert that field with a comma after it. |

The above are insert triggers unless they are preceded by a single quote ('). A single quote is an escape character.

TABLE 9, below, indicates several exemplary context dependant input triggers for a pivot table name. Column 1 identifies exemplary user input scenarios and column 2 indicates exemplary descriptions of the response in the interface. TABLE 9 represents general examples of keyboard interactions and is not meant for limiting the present invention.

TABLE 9

| User Input Triggers For Pivot Table Name Dependencies | Description of Response |
|---|---|
| [ (Open square Bracket) | When an autocomplete pivot table name is selected, typing left bracket will insert that pivot table name with a left bracket after it. |
| All User Input Triggers for Defined Names dependencies. [TABLE 6] | The input triggers for defined names dependencies will work the same way for pivot table name dependencies. |

TABLE 10, below, indicates several exemplary context dependant input triggers for a pivot table field. Column 1 identifies exemplary user input scenarios and column 2 identifies exemplary descriptions of the response in the interface. TABLE 10 represents general examples of keyboard interactions and is not meant for limiting the present invention.

TABLE 10

| User Input Triggers For Pivot Table Fields Dependencies | Description of Response |
|---|---|
| ] (Closing square bracket) | When an autocomplete pivot table field is selected, typing a right bracket will insert that field with a right bracket after it. |

TABLE 10-continued

| User Input Triggers For Pivot Table Fields Dependencies | Description of Response |
|---|---|
| , (comma) | When an autocomplete pivot table field is selected, typing acomma will insert that field with a comma after it. |
| . (Period) | When an autocomplete pivot table field is selected, typing aperiod will insert that field with a period after it. |
| : (Colon) | When an autocomplete pivot table field is selected, typing acolon will insert that field with a colon after it. |

The above are insert triggers unless they are preceded by a single quote ('). A single quote is an escape character.

TABLE 11, below, indicates several exemplary context dependant input triggers for sheet data. Column 1 identifies exemplary user input scenarios and column 2 indicates exemplary descriptions of the response in the interface. TABLE 11 represents general examples of keyboard interactions and is not meant for limiting the present invention.

TABLE 11

| User Input Triggers For Sheet Data Connection Dependencies | Description of Response |
|---|---|
| " (Quote) | When an autocomplete sheet data connection is selected, typing a quote will insert that connection name with a quote after it |
| , (Comma) | When an autocomplete sheet data connection is selected, typing a comma will insert that connection name with a comma after it. |

TABLE 12, below, indicates several exemplary context dependant input triggers for a sheet data slicer. Column 1 identifies exemplary user input scenarios and column 2 indicates exemplary descriptions of the response in the interface. TABLE 12 represents general examples of keyboard interactions and is not meant for limiting the present invention.

TABLE 12

| User Input Triggers For Sheet Data Slicer Dependencies | Description of Response |
|---|---|
| ] (Closing square bracket) | When an autocomplete sheet data slicer is selected, typing a closing bracket will insert that slicer with a closing bracket after it. |
| " (Quote) | When the active auto complete selection is on a sheet data slicer typing a quote will insert that slicer with a quote after it |
| . (Period) | When an autocomplete sheet data connection is selected, typing a period will insert that slicer with a period after it. |
| : (Colon) | When an autocomplete sheet data connection is selected, typing a colon will insert that slicer with a colon after it. |

4. Exemplary Tips Windows

Referring to FIG. 4, as previously stated, reference number 406 is a tips window. In one embodiment, a tips window includes a content text line and a description of the selected autocomplete member. The tips window may include any information that helps a user identify a component. As indicated in FIG. 4, tips window 406 may appear when an autocomplete member is highlighted in the array of autocomplete members. TABLE 13, below, indicates one example of a tips window for a spreadsheet function dependency. Column 1 identifies an exemplary content of the tips window and column 2 is an example. TABLE 13 represents a general example of a tips window and is not meant for limiting the present invention.

TABLE 13

| Content of Tips Window for a Spreadsheet Function Dependency | Example |
|---|---|
| Line 1: Function Prototype (function name in all caps and bold) | SECOND(serial_number) |
| Line 2: Function description | Returns the seconds of a time value. The second is givens as an integer in the range 0 (zero) to 59. |

TABLE 14, below, indicates one example of a tips window for a user defined function dependency. Column 1 identifies an exemplary content of the tips window and column 2 is an example. TABLE 14 represents a general example of a tips window and is not meant for limiting the present invention.

TABLE 14

| Content of Tips Window for a User Defined Function Dependency | Example |
|---|---|
| Line 1: Function Prototype (function name in all caps and bold) | CircleArea(Radius) |
| Line 2: Text saying "user defined function" | "User defined function" |

TABLE 15, below, indicates one example of a tips window for an enumerated argument dependency. An enumerated argument may include all Boolean arguments (true/false, on/off, yes/no etc.). An enumerated argument may also include traditional enumerated argument where a numerical value maps to a choice (1-average, 2-count, etc.). Column 1 identifies an exemplary content of the tips window and column 2 is an example. TABLE 15 represents a general example of a tips window and is not meant for limiting the present invention.

TABLE 15

| Content of Tips Window for an Enumerated Argument Dependency | Example |
|---|---|
| Line 1: Description of the enumerated dependency | Use Count to subtotal the count of items within a list |

TABLE 16 below, indicates one example of a tips window for a defined names dependency. Column 1 identifies an exemplary content of the tips window and column 2 is an example. TABLE 16 represents a general example of a tips window and is not meant for limiting the present invention.

TABLE 16

| Content of Tips Window for a Defined Name Dependency | Example |
|---|---|
| Line 1: "Defined Name -" + value IF dependency = string then wrap value in double quotes. IF dependency is a relative dependency then the text is shown (relative reference) | Defined Name - Sheet1!$A$1:$G$55 Defined Name - "some string of text" Defined Name - (relative dependency) |
| Line 2: "Comment:" + the comment text IF no comment then second line is not shown | Comment: This should only be used for 2003 calculations. |

TABLE 17 below, indicates one example of a tips window for a list dependency. Column 1 identifies an exemplary content of the tips window and column 2 is an example. TABLE 17 represents a general example of a tips window and is not meant for limiting the present invention.

TABLE 17

| Content of Tips Window for a List Dependency | Example |
|---|---|
| Line 1: "List Name -" + value | List Name - Sheet1!$A$1:$G$55 List Name - a long text string that will get truncated. |
| Line 2: "Comment:" + the comment text IF no comment then we don't show the second line | Comment: This should only be used for 2003 calculations. |

TABLE 18 below, indicates another example of a tips window for a list dependency. The tips window exemplified in TABLE 18 may be utilized when a user is working within the specifier of a list and, as shown in FIG. 6, the dependency is a special item 610. Column 1 identifies an exemplary content of the tips window and column 2 is an example. TABLE 18 represents a general example of a tips window and is not meant for limiting the present invention.

TABLE 18

| Content of Tips Window for a List Dependency - Specifier - Special Item | Example |
|---|---|
| Line 1: Description of the special item. | Special Item Strings [#All] - Returns the entire contents of the List (Table?), or specified List columns including column headers, data, and total rows. [#Data] - Returns the data cells of the List, or specified List columns. [#Headers] - Returns the column headers for the List, or specified List columns. [#Totals] - Returns the total rows for the List, or specified List columns. |

TABLE 19 below, indicates another example of a tips window for a list dependency. The tips window exemplified in TABLE 19 may be utilized when a user is working within the specifier of a list and, as shown in FIG. 6, the dependency is a Column name 608. Column 1 identifies an exemplary content of the tips window and column 2 is an example. TABLE 19 represents a general example of a tips window and is not meant for limiting the present invention.

TABLE 19

| Content of Tips Window for a List Dependency - Specifier - Column Name | Example |
| --- | --- |
| Line 1: "column from" <listname><br>Line 2: "Range:" <range> | "column from MyList"<br>"Range: $A$1:$G$41" |

TABLE 20 below, indicates one example of a tips window for a pivot dependency. Column 1 identifies an exemplary content of the tips window and column 2 is an example. TABLE 20 represents a general example of a tips window and is not meant for limiting the present invention.

TABLE 20

| Content of Tips Window for a Pivot Dependency | Example |
| --- | --- |
| Line 1: "Pivot Table -" + activerange<br>Line 2: "Comment:" + the comment text<br>IF no comment then we don't show the second line | Pivot Table - Sheet1!$A$1:$G$55<br>Comment: is the corporate sales pivot table for 03 |

TABLE 21 below, indicates another example of a tips window for a pivot dependency. The tips window exemplified in TABLE 21 may be utilized when a user is working within the specifier of a pivot and, as shown in FIG. 7, the dependency is a special item 710. Column 1 identifies an exemplary content of the tips window and column 2 is an example. TABLE 21 represents a general example of a tips window and is not meant for limiting the present invention.

TABLE 21

| Content of Tips Window for a Pivot Dependency - Specifier - Special Item | Example |
| --- | --- |
| Line 1: Description of the special item | Special Item Strings<br>[#All] - Returns the entire PivotTable body including headers, data, subtotals, and grand totals.<br>[#Data] - Returns the data cells of the PivotTable, not including subtotals or grand totals.<br>[#Headers] - Returns the headers for the specified field or fields of the PivotTable.<br>[#Grand Total] - Returns the grand totals for the entire PivotTable.<br>[#Row Grand Totals] - Returns the grand totals across the rows of the PivotTable.<br>[#Column Grand Totals] - Returns the grand totals down the columns of the PivotTable.<br>[#Page Fields] - Returns the page fields for the PivotTable.<br>[#Subtotals] - Returns the subtotals for a specified item. |

TABLE 22 below, indicates yet another example of a tips window for a pivot dependency. The tips window exemplified in TABLE 22 is another tips window that may be utilized when a user is working within the specifier of a pivot and, as shown in FIG. 7, the dependency is a special item 710. Column 1 identifies an exemplary content of the tips window and column 2 is an example. TABLE 22 represents a general example of a tips window and is not meant for limiting the present invention.

TABLE 22

| Content of Tips Window for a Pivot Dependency - Specifier - Special Item | Example |
| --- | --- |
| Line 1: "Item of" <pivot table name><br>Line 2: Contains: "{" <value1>, <value2>, <valueN>... "}"<br>IF no additional data<br>"Contains no additional data" | Item of MyPivot<br>Contains: {bike, car, truck, sled, or skates} Or<br>"Contains no additional data" |

TABLE 23 below, indicates still another example of a tips window for a pivot dependency. The tips window exemplified in TABLE 23 may be utilized when a user is working within a pivot field. Column 1 identifies an exemplary content of the tips window and column 2 is an example. TABLE 23 represents a general example of a tips window and is not meant for limiting the present invention.

TABLE 23

| Content of Tips Window for a Pivot Dependency - Field | Example |
| --- | --- |
| Line 1: "Field of" <pivot table name><br>Line 2: Contains: "{" <value1>, <value2>, <valueN>... "}"<br>IF no additional data<br>"Contains no additional data" | Field of MyPivot<br>Contains: {Albanaia, Afgana, Afrotesia, Am...}<br>Or<br>"Contains no additional data" |

TABLE 24 below, indicates one example of a tips window for a sheet data dependency. TABLE 24 refers to a sheet data connection dependency. A connection is a name or string for connection to a cube. Column 1 identifies an exemplary content of the tips window and column 2 is an example. TABLE 24 represents a general example of a tips window and is not meant for limiting the present invention.

TABLE 24

| Content of Tips Window for a Sheet Data Dependency - Connection | Example |
| --- | --- |
| Line 1: <Connection description><br>This field is retrieved from the external connections list it is a field that the user can fill in if they desire<br>IF no description<br>"Connection to cube" | This is the connection to our corporate accounting cube for 2003 Or<br>Connection to cube |

TABLE 25 below, indicates another example of a tips window for a sheet data dependency. TABLE 25 refers to a sheet data name space dependency. A name space is a string containing the member name of a member within the cube. Column 1 identifies an exemplary content of the tips window and column 2 is an example. TABLE 25 represents a general example of a tips window and is not meant for limiting the present invention.

TABLE 25

| Content of Tips Window for a Sheet Data Dependency - Name Space | Example |
| --- | --- |
| Line 1: <item type><br>The Item type will be retrieved from the cube along with the items<br>IF the item is a member we show the following | Dimension<br>Member: [region].[state].[city].[seattle] |

TABLE 25-continued

Content of Tips Window for a Sheet
Data Dependency - Name Space     Example

<item type> ":" <member unique name>
The member unique name will be
retrieved from the cube along with the
items
List of item types Member:
Property:
KPI:
Dimension:
Hierarchy:
Level:
Attribute:
Set:

5. Exemplary Process

Figure 11:
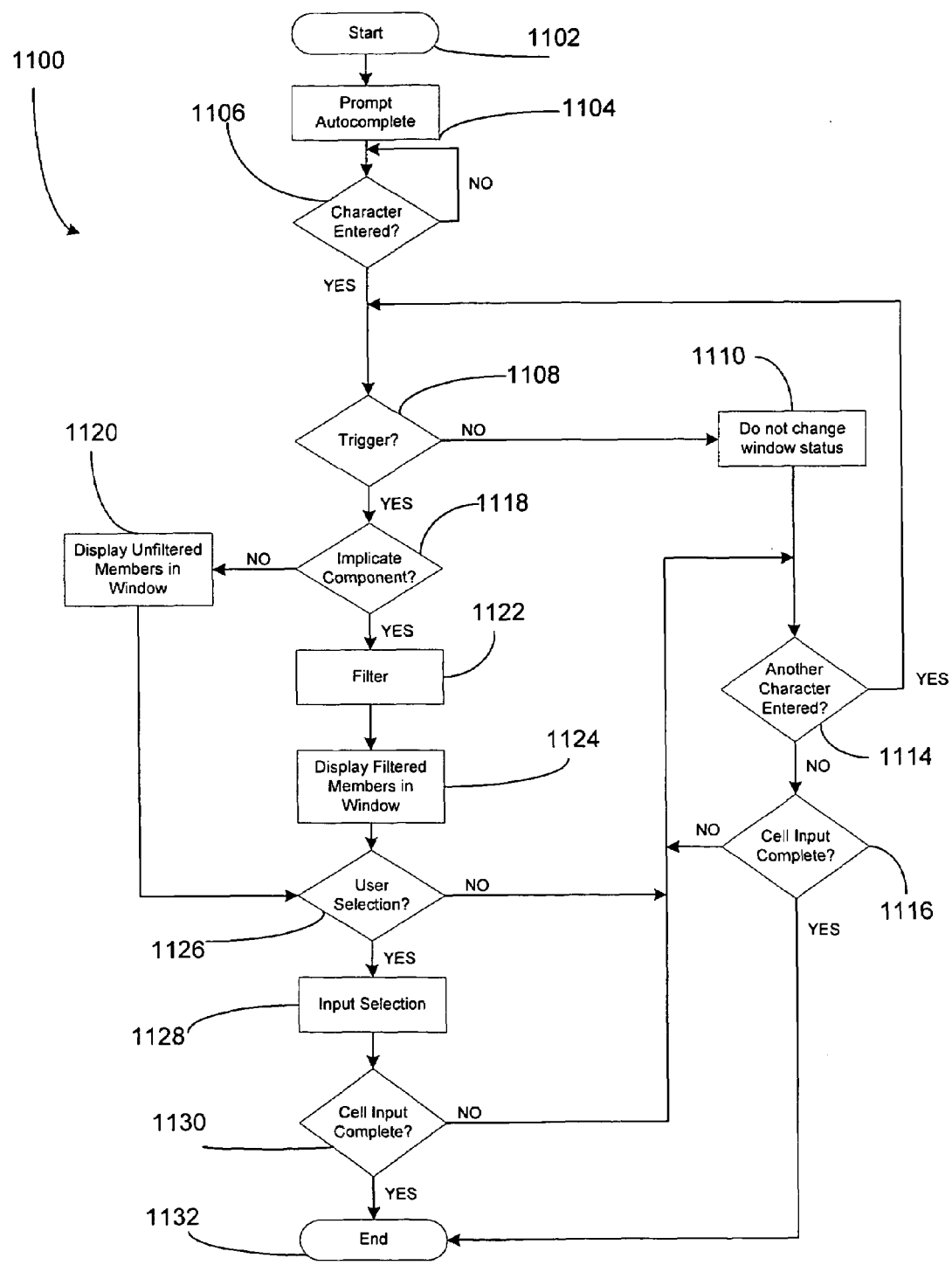
FIG. 11 illustrates a logical flow diagram of one aspect of the present invention.

FIG. 11 illustrates a logical flow diagram of a process for automatically completing a formulaic cell. The process 1100 starts at starting block 1102 and flows to block 1104 where a user prompts the autocomplete process. In one embodiment of the present invention, the user prompts the autocomplete process 1100 by entering the "=" symbol into a formulaic cell. In another embodiment, the user prompts the autocomplete process by actuating the process from a drop down window of a tool bar. It is further contemplated that any number, letter, symbol, or user input may be used to prompt the autocomplete process 1100 without departing from the spirit or scope of the present invention.

The process 1100 continues to block 1106 where it is determined if a character has been entered. If a character has already been entered, the process 1100 continues to block 1110 as set forth below. If a character has not been entered, the process 1100 remains dormant until it is determined that a character has been entered. Again, a character may include any number, letter, punctuation, symbol or user input.

If a character has been entered, the process 1100 continues to block 1108 where it is determined if the character is a trigger. If a character is not a trigger the process continues to block 1110, where the status of the autocomplete drop down window does not change. Stated another way, if the drop down window is dormant, it remains dormant. In other situations, if the drop down window is displaying a set of components, it remains displaying the same set of components. TABLE 3, above, lists a few exemplary scenarios when an input character will not actuate the display of the window. These scenarios are for exemplary purposes only; it is further contemplated that the window may remain dormant in any situation where it is undesirable to display the window.

The process 1100 continues to block 1114 where it is determined whether another character has been entered. In the situation where another character has been entered, the process 1100 loops back to block 1108 where it is determined if the character is a trigger. If it is determined that another character has not been entered, the process 1100 continues to block 1116 where it is determined whether the cell input is complete. If the cell input is complete, the process ends at end block 1132. If the cell input is not complete, the process loops back to block 1114.

If, at block 1108, it is determined that the input is a trigger, the process 1100 continues to block 1118 where it is determined if a particular component is implicated. TABLE 4, above, lists a few exemplary scenarios when a trigger does not implicate a particular component. Other exemplary scenarios include inputting a space, arithmetic operator, character operator or a full autocomplete member. In such a situation, the autocomplete array members are not filtered and the autocomplete drop down window will include the entire list of autocomplete members as indicated by block 1120.

If, at block 1118, the trigger does implicate a component, the process 1100 will flow to block 1122. Block 1122 indicates the step of filtering the autocomplete array members to include only members that relate to the implicated component. For example, a user may enter an open parenthesis. In the situation where an open parenthesis is only used in a formulaic cell to build a spreadsheet formula or a user defined formula, the filter will filter out all components except spreadsheet formula dependencies and user-defined dependencies. As another example, a user may enter an open bracket symbol. The open bracket may only implicate a list, pivot or a sheet data object. In such a situation, the process 1100 will filter out all components that are not lists, pivots or sheet data objects.

The process 1100 continues to block 1124 where the filtered members are included in a drop down window for user selection. Block 1126 indicates the decision whether or not to select an autocomplete member from the drop down window. If a selection is not made, the process 1100 loops back to block 1114. If a selection is made, the selection is input into the formulaic cell as indicated by block 1128 and the process 1100 continues to block 1130 where it is determined if cell input is complete. If cell input is complete, the process 1100 ends at end block 1132. If the cell input is not complete the process 1100 loops back to block 1114.

Illustrative Operating Environment

Figure 1:
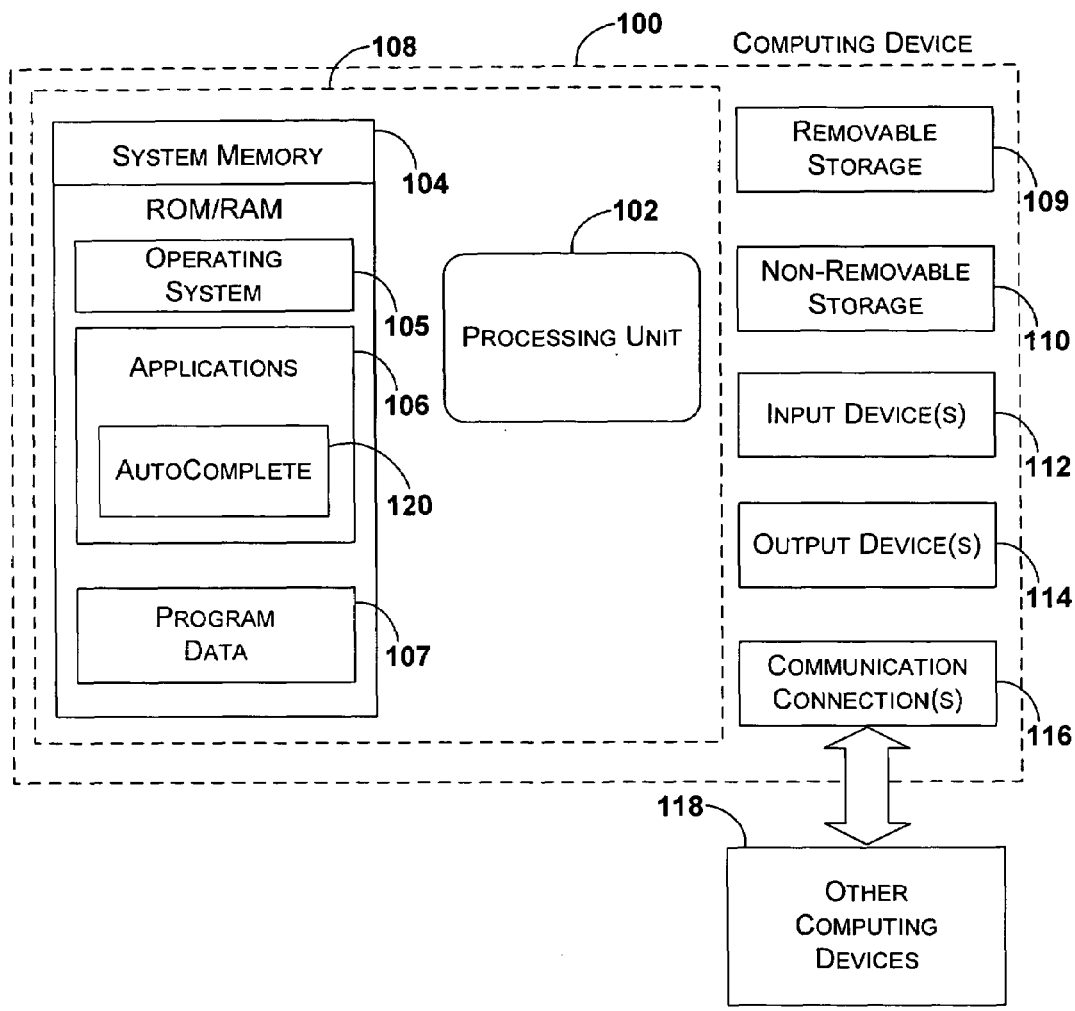
FIG. 1 illustrates an exemplary computing device that may be used in one exemplary embodiment of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include an application 120 for automatically completing a formulaic cell in accordance with the present invention.

Figure 2:
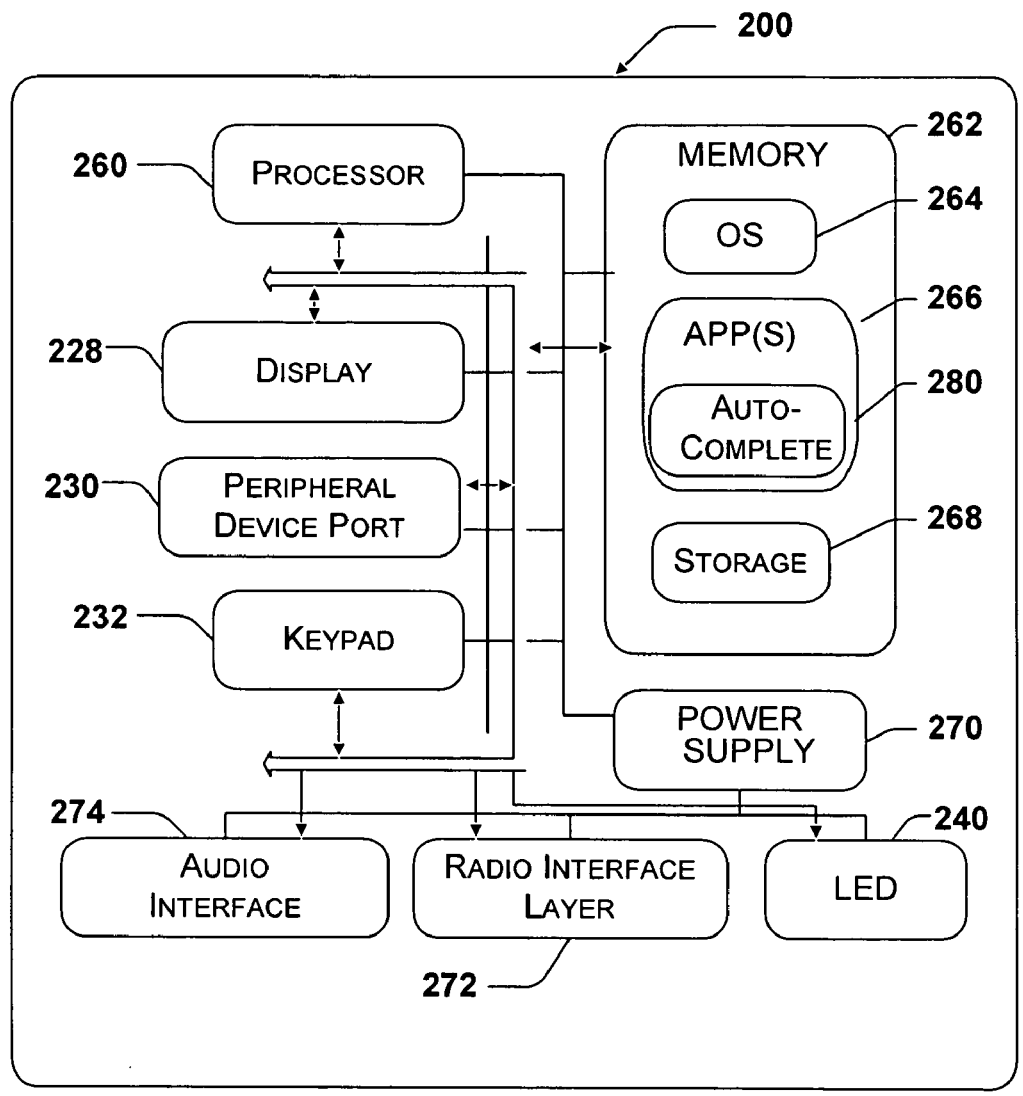
FIG. 2 illustrates an exemplary mobile device that may be used in one exemplary embodiment of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

In one embodiment, applications 266 further include an application 280 for automatically completing a formulaic cell in accordance with the present invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for automatically completing formulaic cell data, comprising:
substantiating an autocomplete process in response to receiving a character associated with formulaic cell data;
determining whether the character is a trigger;
displaying a list of autocomplete options associated with a component implicated by the trigger when the character is a trigger, wherein the displayed list of autocomplete options associated with the component includes:
displaying, in the first scrollable window a plurality of possible options for automatically completing the formulaic cell data in association with the component,
determining at least one component category for each of the plurality of possible options,
displaying, adjacent to each of the plurality of possible options, an icon, wherein the icon displayed adjacent to each of the plurality of possible options indicates the at least one component category for each of the plurality of possible options, the at least one component category comprising at least one of: spreadsheet function dependencies, defined name dependencies, a list, pivot dependencies, user-defined function dependencies, enumerated argument dependencies, sheet data object dependencies, and date object dependencies, and
filtering the plurality of possible options dynamically as additional characters are received; and
displaying a list of autocomplete options associated with the character when the character is not a trigger, wherein the displayed list of autocomplete options associated with the character includes displaying a plurality of possible options for automatically completing the formulaic cell data in association with the character, wherein the displayed plurality of options are dynamically filtered as additional characters are received.

2. The computer-implemented method of claim 1, further comprising actuating the autocomplete process before substantiating the autocomplete process.

3. The computer-implemented method of claim 2, wherein actuating the autocomplete process further comprises actuating the autocomplete process by inputting an actuator into the formulaic cell.

4. The computer-implemented method of claim 1, wherein the formulaic cell data includes spreadsheet data.

5. The computer-implemented method of claim 1, wherein displaying a list of autocomplete options associated with a component implicated by the trigger includes aggregating a plurality of components and displaying a list of autocomplete options associated with the aggregated components implicated by the trigger.

6. The computer-implemented method of claim 1, further comprising displaying tips associated with a selected autocomplete option.

7. The computer-implemented method of claim 1, wherein a trigger is not a member of a group comprising: a cell reference, a number, a space, an arithmetic operator and a character operator.

8. The computer-implemented method of claim 1, further comprising hiding the displayed list of autocomplete options when the user input is not a trigger.

9. The computer-implemented method of claim 8, further comprising displaying a scrollable window associated with the list of autocomplete options when a second user input is a trigger.

10. The computer-implemented method of claim 1, wherein displaying a list of autocomplete options further comprises displaying a sorted list of autocomplete options when the trigger implicates a component.

11. The computer-implemented method of claim 10, further comprising sorting the sorted list of autocomplete options for a second time when a second character implicates a component.

12. A computer-readable storage medium having computer-executable instructions for automatically completing formulaic cell data of a formulaic cell, the instructions comprising:
   receiving an actuator input to prompt an autocomplete process for formulaic cell data;
   receiving a character input, wherein the character input causes a first scrollable window to be displayed;
   determining whether the character input is a trigger;
   populating the first scrollable window with autocomplete options for a component when the character input is a trigger, wherein the autocomplete options associated with the component includes:
      displaying, in the first scrollable window a plurality of possible options for automatically completing the formulaic cell data in association with the component,
      determining at least one component category for each of the plurality of possible options,
      displaying, adjacent to each of the plurality of possible options, an icon, wherein the icon displayed adjacent to each of the plurality of possible options indicates the at least one component category for each of the plurality of possible options, the at least one component category comprising at least one of: spreadsheet function dependencies, defined name dependencies, a list, pivot dependencies, user-defined function dependencies, enumerated argument dependencies, sheet data object dependencies, and date object dependencies, and
      filtering the plurality of possible options dynamically as additional characters are received;
   populating the first scrollable window with autocomplete options associated with the character when the character is not a trigger, wherein the autocomplete options associated with the character includes displaying, in the first scrollable window, a plurality of possible options for automatically completing the formulaic cell data in association with the character, wherein the displayed plurality of possible options are dynamically filtered as additional characters are received;
   receiving a selection of at least one of the autocomplete options displayed in the first scrollable window; and
   in response to receiving the selection, displaying adjacent to the selected autocomplete option, a second window having a hint tip dialogue associated with the selected autocomplete option.

13. The computer-readable storage medium of claim 12, wherein the formulaic cell is a spreadsheet cell.

14. The computer-readable storage medium of claim 12, wherein the component includes at least one member of a group comprising: spreadsheet functions, defined names, lists, pivots, user-defined functions, enumerated arguments, sheet data objects and date objects.

15. In a computer system having a graphical user interface including a display and a user interface selection device, a method of providing and selecting from a dynamic list on the display, comprising the steps of:
   substantiating an autocomplete process in response to receiving a character in a formulaic cell;
   aggregating autocomplete options based on the character;
   displaying a dynamic list of autocomplete options associated with a component when the character is associated with the autocomplete options and implicates the components, wherein the displayed dynamic list of autocomplete options associated with the component includes:
      displaying a plurality of possible options for automatically completing the formulaic cell data in association with the component,
      determining at least one component category for each of the plurality of possible options,
      displaying, adjacent to each of the plurality of possible options, an icon, wherein the icon displayed adjacent to each of the plurality of possible options indicates the at least one component category for each of the plurality of possible options, the at least one component category comprising at least one of: spreadsheet function dependencies, defined name dependencies, a list, pivot dependencies, user-defined function dependencies, enumerated argument dependencies, sheet data object dependencies, and date object dependencies, and
      filtering the plurality of possible options dynamically as additional characters are received,
   displaying a dynamic list of autocomplete options associated with the character when the character is associated with the autocomplete options and does not implicate a component, wherein the dynamic displayed list of autocomplete options associated with the character includes displaying a plurality of possible options for automatically completing the formulaic cell data in association with the character, wherein the displayed plurality of possible options are dynamically filtered as additional characters are received; and
   hiding the autocomplete process when the character is not associated with the autocomplete options.

* * * * *